United States Patent [19]
Sethuraman

[11] Patent Number: 6,037,987
[45] Date of Patent: Mar. 14, 2000

[54] APPARATUS AND METHOD FOR SELECTING A RATE AND DISTORTION BASED CODING MODE FOR A CODING SYSTEM

[75] Inventor: Sriram Sethuraman, Hightstown, N.J.

[73] Assignee: Sarnoff Corporation, Princeton, N.J.

[21] Appl. No.: 09/001,703

[22] Filed: Dec. 31, 1997

[51] Int. Cl.[7] ................................ H04N 7/32
[52] U.S. Cl. ............... 348/415; 348/412; 382/238
[58] Field of Search ............... 348/400, 409–413, 348/415–416, 384, 390, 394, 401–404, 405, 407, 419; 386/111; 382/236, 238

[56] References Cited

U.S. PATENT DOCUMENTS

| | | | |
|---|---|---|---|
| 5,459,515 | 10/1995 | Chevance et al. | 348/402 |
| 5,491,514 | 2/1996 | Fukuda et al. | 348/397 |
| 5,608,458 | 3/1997 | Chen et al. | 348/413 |
| 5,627,938 | 5/1997 | Johnston | 395/2.39 |
| 5,691,770 | 11/1997 | Keesman et al. | 348/405 |
| 5,694,171 | 12/1997 | Katto | 348/405 |
| 5,818,536 | 10/1998 | Morris et al. | 348/416 |
| 5,909,513 | 6/1999 | Liang et al. | 382/253 |

FOREIGN PATENT DOCUMENTS

| | | | |
|---|---|---|---|
| 2691272 | 11/1993 | France | H04N 7/32 |

*Primary Examiner*—Vu Le
*Attorney, Agent, or Firm*—William J. Burke

[57] ABSTRACT

An apparatus and concomitant method for selecting a macroblock coding mode based on the measured distortion associated with the selected coding mode is disclosed. The invention selects a coding mode that has a distortion measure that is nearest to an expected operating distortion. Once an initial coding mode is selected, the invention applies a trade-off operation. The best coding mode after the trade-off operation is selected as the coding mode for the current macroblock.

20 Claims, 4 Drawing Sheets

APPARATUS AND METHOD FOR SELECTING A RATE AND DISTORTION BASED CODING MODE FOR A CODING SYSTEM

The present invention relates to an apparatus and concomitant method for optimizing the coding of motion video. More particularly, this invention relates to an apparatus and method that selects a coding mode based upon the measured distortion and the bits required for each mode.

BACKGROUND OF THE INVENTION

To address the diverse development of digital video technology, various standards are established to provide standard coding/decoding strategies with sufficient flexibility to accommodate a plurality of different applications and services, such as desktop video publishing, video conferencing, digital storage media and television broadcast. These standards include, but are not limited to, the Moving Picture Experts Group Standards (e.g., MPEG-1 (11172-*) and MPEG-2 (13818-*), H.261 and H.263. As such, the present invention is described below using an MPEG encoder, but it should be understood that the present invention can be employed in encoders that are in compliant with other coding standards.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific method needed to produce a valid bitstream. Furthermore, MPEG encoder designers are accorded great flexibility in developing and implementing their own MPEG-specific methods in areas such as image pre-processing, motion estimation, coding mode decisions, scalability, and rate control. This flexibility fosters development and implementation of different MPEG-specific methods, thereby resulting in product differentiation in the marketplace. However, a common goal of MPEG encoder designers is to minimize subjective distortion for a prescribed bit rate and operating delay constraint.

More specifically, in the area of coding mode decision, MPEG provides a plurality of different macroblock coding modes. Mode decision is the process of deciding among the various coding modes made available within the confines of the syntax of the respective video encoders. Generally, these coding modes are grouped into two broad classifications, inter mode coding and intra mode coding. Intra mode coding involves the coding of a macroblock or picture that uses information only from that macroblock or picture. Conversely, inter mode coding involves the coding of a macroblock or picture that uses information both from itself and from macroblocks and pictures occurring at different times. For example, MPEG-2 provides macroblock coding modes which include intra mode, no motion compensation mode (No MC), skipping, frame/field/dual-prime motion compensation inter modes, forward/backward/average inter modes and field/frame DCT modes. For a detailed description of each coding mode, see the ISO/IEC international Standards for MPEG-1 and MPEG-2.

These coding modes provide different coding strategies (predictions) which produce different efficiencies in the number of bits necessary to code a macroblock. Thus, each mode can be more efficient than another depending upon a number of different factors such as the coarseness of the quantization scale, picture type, and nature of the signal within the macroblock. To achieve optimal coding performance, it is necessary to select the most efficient coding mode by calculating and comparing the number of bits necessary to code a particular macroblock at a given distortion for each separate mode. The most efficient coding mode should code the macroblock with the least amount of bits at a given distortion.

Various test models provide a baseline implementation of the standards that usually make the mode decision based on only the distortion after motion compensation. For example, in the current MPEG coding strategies (e.g., Test Models 4 and 5 (TM4 and TM5)), the coding mode for each macroblock is selected by comparing the energy of the predictive residuals (error signal). Namely, the intra mode/inter mode decision is determined by a comparison of the variance ($\sigma^2$) of the macroblock pixels against the variance of the predictive residuals for each coding mode. However, the coding mode selected by this criterion may not achieve optimal coding performance, since a high variance may not necessarily translate to an increase in the number of bits necessary to code a macroblock.

Furthermore, such mode decision methods ignore the number of bits needed to code each mode (e.g., bidirectional interpolation requires two (2) motion vectors and the reduction in distortion, if any, should be valued against the increase in the number of bits to code the additional motion vector). The bits can be split into motion vector coding bits, DCT coding bits, and overhead bits. At very low bit-rates (e.g., real time applications), the motion vector coding bits become quite significant.

Furthermore, other methods attempt to address mode decision by using a computationally expensive joint rate and distortion optimal/near-optimal approach that computes a joint cost function between distortion and rate (suitably added through a Lagrangian multiplier). Thus, some of the current methods are computationally very expensive as these methods involve iterative estimation of the Lagrangian multiplier, while other methods resort to oversimplification of the mode decision process, thereby achieving little or no improvement in performance.

Therefore, a need exists in the art for an apparatus and method for selecting a coding mode which approaches the optimal solution and is relatively simple to facilitate practical implementation, e.g., real time application.

SUMMARY OF THE INVENTION

The present invention is an apparatus and method for selecting a macroblock coding mode based on the measured distortion and bits used for each coding mode. More specifically, the present invention selects a coding mode that has a distortion measure that is nearest to an expected operating distortion. The expected operating distortion is adaptively updated or can be deduced from previously encoded frames of similar type. Once an initial coding mode is selected, the present invention applies a trade-off operation to estimate the bits usage for the unselected coding modes at the chosen/desired distortion. Namely, the initial selected coding mode serves as a baseline. The best coding mode after the trade-off operation is selected as the coding mode for the current macroblock.

Furthermore, the present invention provides a method to quickly eliminate some coding modes from consideration. Namely, a plurality of thresholds are used to compare the distortion of different non-intra modes with the distortion (thresholds) of the intra coding mode.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
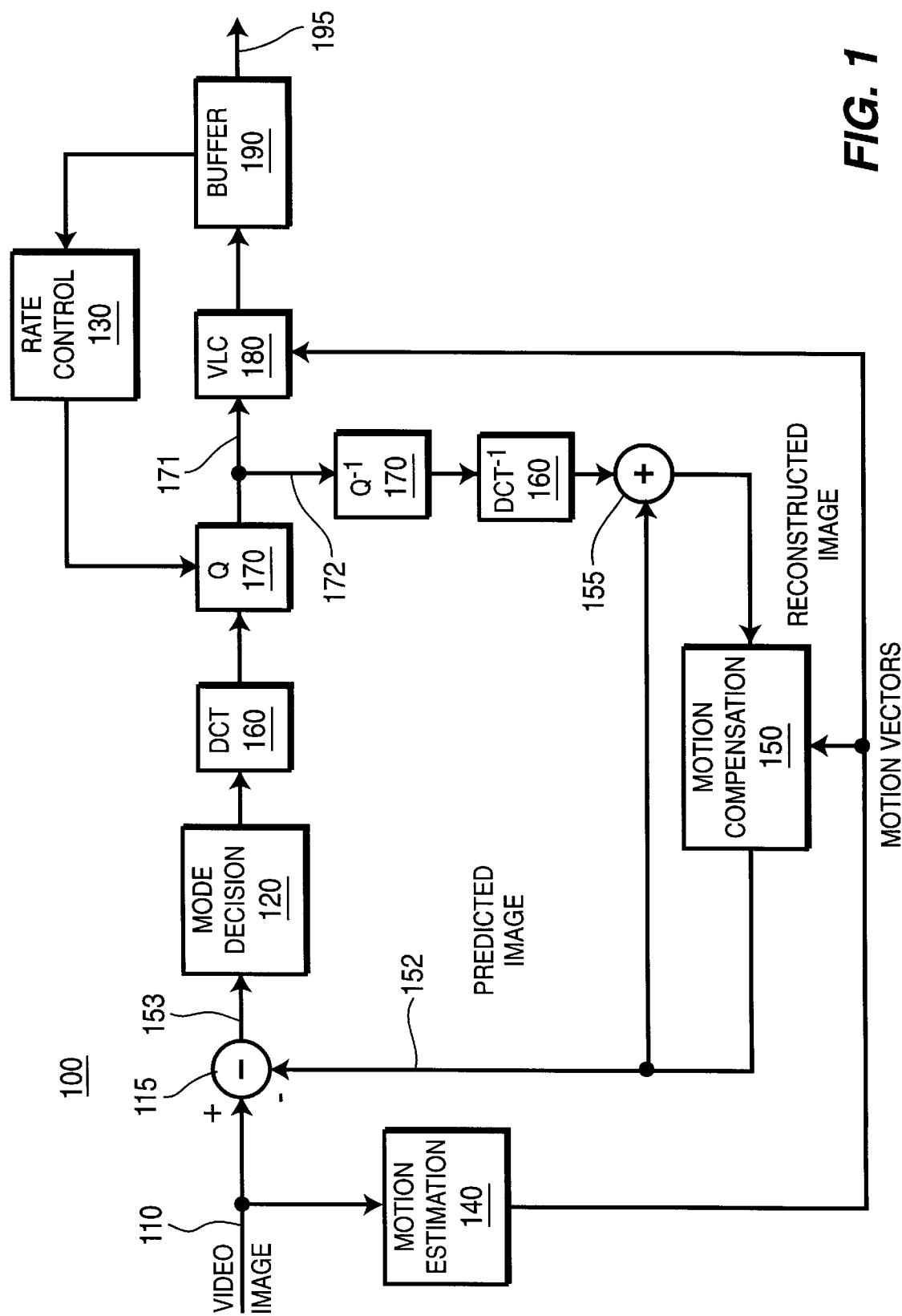
FIG. 1 illustrates a block diagram of the system of the present invention for determining the mode decision selection.

FIG. 1 depicts a block diagram of the apparatus 100 of the present invention for determining a coding mode for a macroblock. In the preferred embodiment of the present invention, the apparatus 100 is an encoder or a portion of a more complex block-based motion compensated coding system. The apparatus 100 comprises a motion estimation module 140, a motion compensation module 150, a mode decision module 120, a rate control module 130, a transform module, (e.g., a DCT module) 160, a quantization module 170, a coder, (e.g., a variable length coding module) 180, a buffer 190, an inverse quantization module 175, an inverse transform module (e.g., inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate of the current frame.

Furthermore, prior to performing motion compensated prediction for a given macroblock, a coding mode must be selected. As discussed above, a plurality of coding modes is available and the proper selection of a coding mode for each macroblock will produce optimal coding performance. In the preferred embodiment of the present invention, a prediction for each coding mode is performed by the motion compensation module 150. Thus, depending on the coding mode, the motion compensation module forms a motion compensated prediction (predicted image) on path 152 of the contents of the block based on past and/or future reference pictures. This motion compensated prediction on path 152 is subtracted via subtractor 115 from the input video image on path 110 in the current macroblocks to form an error signal (e) or predictive residual on path 153. The predictive residuals of all the coding modes for each macroblock are forwarded to the mode decision module 120 for evaluation.

The mode decision module 120 uses the predictive residuals for determining the selection of a coding mode for each macroblock as described in detail below in FIGS. 2–5. Having selected a coding mode for a macroblock, the mode decision module 120 passes the corresponding predictive residual signal from the selected coding mode to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization module 170, where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency. The process of quantization is a key operation and is an important tool to achieve visual quality and to control the encoder to match its output to a given bit rate (rate control).

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input video image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions.

In the preferred embodiment of the present invention, the quantization scale is used to determine the proper selection of a coding mode as illustrated in FIG. 1. Thus, as the rate control module 130 alters the quantization scale to correct an overflow or underflow condition, the mode decision module 120 responds by selecting the most optimal coding mode under the current quantization scale selected for each macroblock. Thus, the present invention can be employed in conjunction with any rate control method. The method in which the selection of a coding mode is affected by the quantization scale is discussed with reference to FIG. 3 below.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the input video image by decoding the data so that they are used as reference frames for subsequent encoding.

Figure 2:
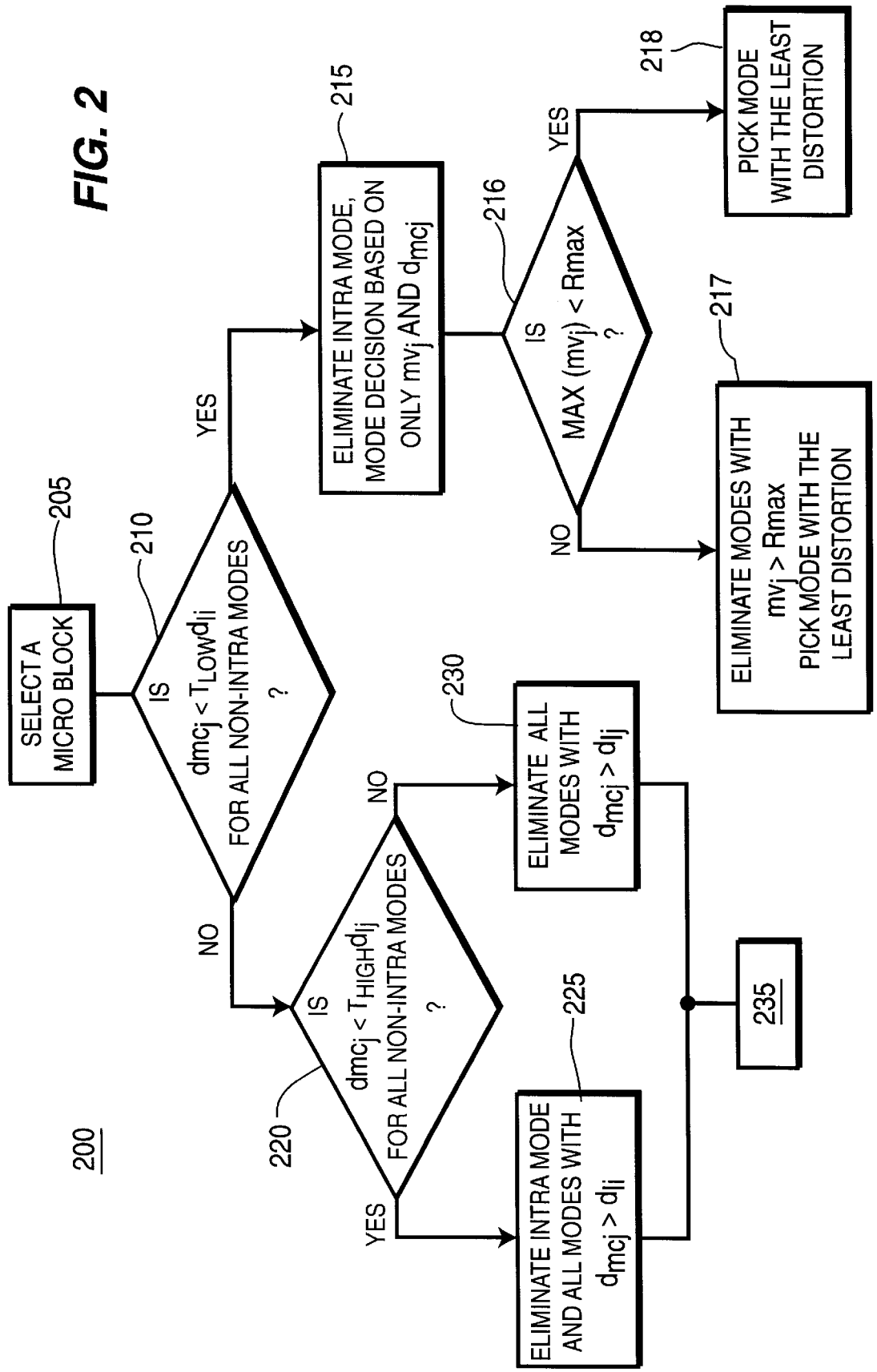
FIG. 2 illustrates a flowchart of a method for implementing complexity reduction to derive the optimal mode decision for a macroblock.

FIG. 2 illustrates a method 200 for implementing complexity reduction. Namely, by using a plurality of thresholds, the present invention can quickly eliminate certain coding modes from consideration, thereby reducing the computational overhead necessary to select a particular coding mode. Method 200 is an initial method to simplify the mode decision process, by quickly comparing the measure of distortion after motion compensation with the measure of intra coding distortion.

More specifically, method 200 selects a macroblock i from a frame in step 205, where the frame can be a predictive residual. At this stage, motion compensation has been performed and method 200 is able to obtain a measure of distortion for a particular macroblock i for all available coding modes k. The measure of distortion can be mean-square-error (MSE), the variance, or the sum of absolute difference computed over the pixels in the macroblock, but the present invention is not limited to a particular method of calculating the distortion measure or metric. It should be noted that although the present invention is described below with reference to a macroblock, the present invention can be applied to other "block" format in accordance with other coding standards.

In step 210, method 200 queries whether the distortion $d_{mcj}$ (distortion after motion compensation) for a coding mode k of macroblock i is less than a threshold $T_{low}d_{Ij}$; for all non-intra coding modes, where $T_{low}$ is a constant (e.g., a value of 0.1 is employed in the preferred embodiment) and $d_{Ij}$ (intra distortion) is a measure of the distortion for the ith macroblock if the macroblock is intra coded. If the query is affirmatively answered, then method 200 proceeds to step 215, where the intra coding mode is eliminated from consideration and the mode decision is based substantially on an evaluation of the motion vector (mv) coding bits, $mv_j$ and its corresponding distortion measure $d_{mcj}$. Namely, the motion compensation for the current macroblock was very effective and it is not necessary to consider intra coding for the current macroblock. Another way to view this conclusion is that the energy in the predictive residual is very small, such that the coding mode decision itself plays a minor role in term of bit consumption, especially when quantization is applied. As such, mv coding bits, $mv_j$ and its corresponding distortion measure $d_{mcj}$ will dictate which coding mode k is appropriate.

Method 200 then proceeds to step 216 where method 200 queries whether the mv coding bits for the various coding modes k are less than the maximum allowed bits, $R_{max}$, assigned for the current macroblock. The maximum allowed bits, $R_{max}$, is generally controlled by a rate control method, e.g., rate control module 130, to avoid underflow and overflow conditions. Depending on the rate control method, $R_{max}$, can be a fixed value or an adaptively updated value. If the query at step 216 is negatively answered, then method 200 proceeds to step 217, where coding modes with $mv_j$ greater than $R_{max}$ are eliminated from consideration. A coding mode with the least distortion is then selected from the remaining modes. If a tie occurs, the coding mode with the lowest mv coding bits is selected.

If the query at step 216 is affirmatively answered, then method 200 proceeds to step 218, where a coding mode with the least distortion is selected. If a tie occurs, the coding mode with the lowest mv coding bits is selected. Method 200 then returns to step 205 and selects the next macroblock.

Returning to step 210, if the query is negatively answered, then method 200 proceeds to step 220, where method 200 queries whether the distortion $d_{mcj}$ for a coding mode k of macroblock i is less than a threshold $T_{High}d_{Ij}$ for all non-intra coding modes, where $T_{High}$ is a constant (e.g., a value of 0.7 is employed in the preferred embodiment) and $d_{Ij}$ is a measure of the distortion for the current macroblock if the macroblock is intra coded. If the query is affirmatively answered, then method 200 proceeds to step 225, where the intra coding mode and any non-intra coding modes with $d_{mcj}$ that are greater than $d_{Ij}$, are eliminated from consideration. Namely, the motion compensation for the current macroblock was fairly effective and it is still not necessary to consider the intra coding mode for the current macroblock, as well as those non-intra coding modes that have distortions greater than $d_{Ij}$, i.e., eliminating non-intra coding modes with $d_{mcj} > d_{Ij}$.

If the query in step 220 is negatively answered, then method 200 proceeds to step 230, where only non-intra coding modes with $d_{mcj}$ that are greater than $d_{Ij}$, are eliminated from consideration. Namely, the motion compensation for the current macroblock was marginally effective and it is now necessary to consider the intra coding mode for the current macroblock. However, those non-intra coding modes that exhibit distortions greater than $d_{Ij}$, i.e., $d_{mcj} > d_{Ij}$, should still be eliminated due to their high distortion measure. From both steps 225 and 230, method 200 proceeds to step 235, where a coding mode is selected for the current macroblock.

It should be noted that the method 200 is initially employed to remove some of the available coding modes from consideration, thereby reducing computational overhead. In other words, the method 200 is effectively using the complexity of the signal in the current macroblock to make a quick initial evaluation as to which coding modes will likely be poor candidates for coding the current macroblock. As such, the steps in method 200 can be considered as optional. Furthermore, method 235 illustrated in FIG. 3 can be implemented with method 200, i.e., method 235 correlates with step 235 in FIG. 2.

Figure 3:
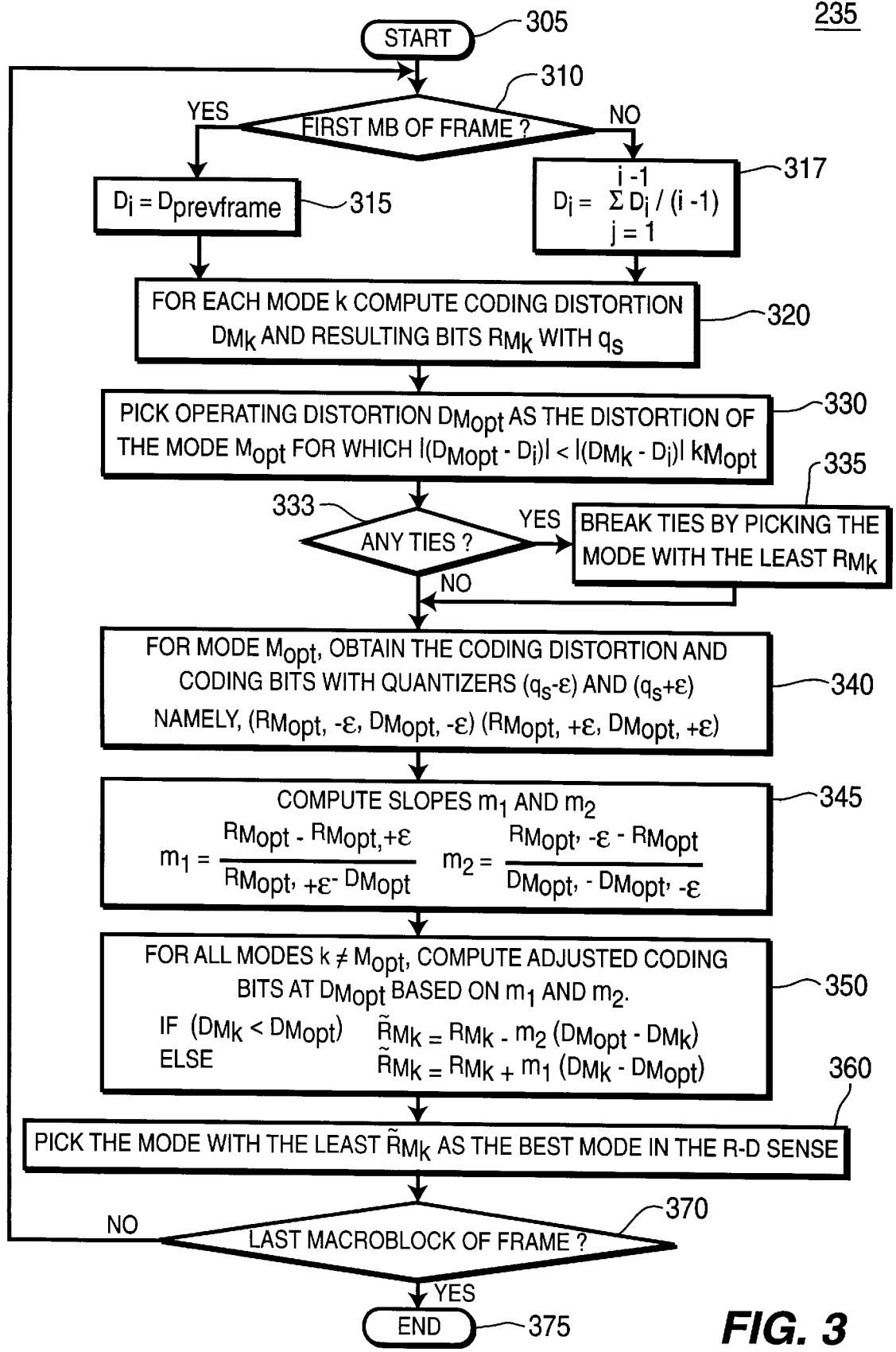
FIG. 3 illustrates a flowchart of a method for selecting a coding mode for the current macroblock.

FIG. 3 illustrates a flowchart of a method 235 for selecting a coding mode for the current macroblock which is based on a chosen "distortion operating point". Namely, method 235 initially selects a coding mode from a pool of available coding modes, where the selected coding mode has a distortion measure that is nearest to an expected distortion level. Once chosen, the selected coding mode serves as a baseline. Other coding modes are then adjusted to the baseline and evaluated for performance as compared to the initially selected coding mode.

More specifically, method 235 starts in step 305 and proceeds to step 310, where method 235 queries whether the current macroblock is a first macroblock of a frame. If the query is affirmatively answered, then method 235 proceeds to step 315, where the distortion $D_i$ is set to the average distortion over the entire previous frame, i.e., $\overline{D}_{prevframe}$. Namely, for the initial macroblock, the average distortion over the previous frames of similar picture-type can be used. Typical values of distortion for each picture-type are initialized at the start of a sequence. This provides an initial starting point for an expected distortion, but it should be understood that other criteria or measures can be used to provide this starting distortion point.

If the query in step 310 is negatively answered, then method 235 proceeds to step 317, where the distortion $D_i$ for the $i^{th}$ macroblock is expressed as:

$$D_i = \left(\sum_{j=1}^{i-1} D_j\right) / (i-1) \quad (1)$$

where (i-1) is the number of previously processed macroblocks in the current frame. The goal of the encoder is to achieve as uniform a quality over a frame within the bit-budget provided. Hence, the desired distortion (expected operating distortion measure) can be predicted as the running average of the distortion over the macroblocks processed already. Again, the present invention is not limited to this particular distortion measure or metric.

In step 320, for each coding mode k, method 235 applies a quantizer scale $q_a$ (which is selected for the current macroblock supplied by rate control) to compute the final coding distortion $D_{Mk}$ (the distortion after encoding) and the resulting bits that were used $R_{Mk}$.

In step 330, method 235 selects a distortion operating point that is closest to the average distortion over the portion of the current frame that has been processed so far, i.e., $D_i$ as calculated in step 317. Given this expected distortion, the coding mode with distortion closest to the desired distortion is chosen.

Figure 4:
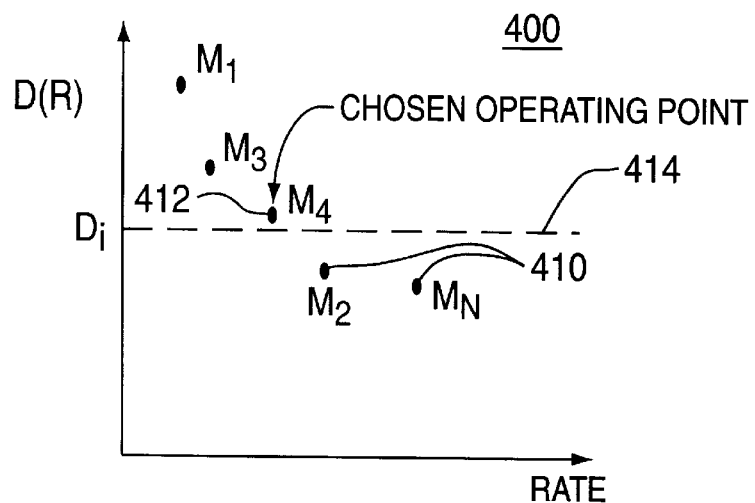
FIG. 4 illustrates coding modes on the rate-distortion plane.

For example, FIG. 4 illustrates a rate-distortion (R-D) curve 400 defined by five possible coding modes $M_{1-N}$ 410, where the coding mode $M_4$ 412 is closest to $D_1$ 414. As such, the coding mode represented by $M_4$ 412 is initially selected as the selected or chosen coding mode $M_{opt}$ for the current macroblock. Thus, the bits needed when coded with the $q_s$ set by rate control and the resulting distortions constitute the points on the R-D curve 400. It should be noted that the process of computing the motion vector coding bits, DCT coding bits, and overhead bits is dictated by the syntax of the coding standard.

In step 333, method 235 queries whether two coding modes have the same distortion, i.e., a tie. If the query is affirmatively answered, method 235 proceeds to step 335, where the coding mode with the fewer number of bits is chosen. If the query is negatively answered, method 235 proceeds to step 340.

In step 340, method 235 trades off coding bits for distortion for each of the unselected coding modes. Namely, method 235 determines the adjusted coding bits for each unselected coding mode at the chosen operating distortion for the macroblock.

Figure 5:
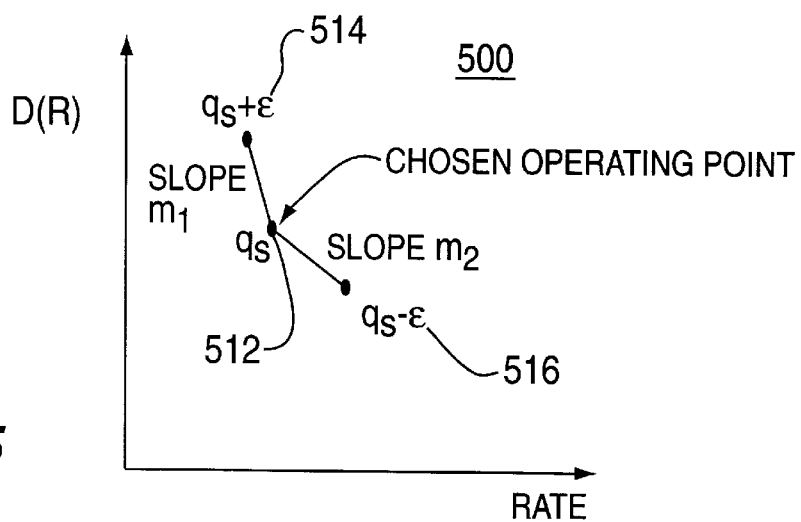
FIG. 5 illustrates a rate-distortion (R-D) curve.

FIG. 5 illustrates a second rate-distortion (R-D) curve 500 with a pair of offsets from the chosen operating point. More specifically, for the coding mode chosen in step 330, the scalar quantizer $q_s$ is incremented by the smallest possible increment $\epsilon$ 514 that can be communicated to the decoder and the resulting bit-rate and distortion are computed. This constitutes a point in the R-D space above the chosen operating point (see FIG. 5). Similarly $q_s$ is decremented by the next lower value $\epsilon$ 516 that can be coded and the resulting bit-rate and distortion are computed. This provides a point below the operating point in the R-D space. In the preferred embodiment, it is assumed that $\epsilon$ 514 and $\epsilon$ 516 are identical, but it should be understood that they are not so limited. Again, the smallest possible increment or decrement $\epsilon$ is dictated by a particular coding standard. Thus, the trade-off between rate and distortion above and below the chosen operating distortion can be obtained.

Returning to FIG. 3, method 235 in step 340 obtains a new distortion-rate pair for the selected coding mode using the new quantizer scales $q_s + \epsilon$ and $q_s - \epsilon$. Let $(R_{Mk}, D_{Mk})$ be the rate and distortion values for the kth mode when quantized with the fixed $q_s$. Let $(R_{Mopt}, D_{Mopt})$ be the mode chosen in step 330. Let $(R_{Mopt-1}, D_{Mopt-1})$ and $(R_{Mopt,+1}, D_{Mopt,+1})$ denote the rate and distortion when quantized with $q_s - \epsilon$ and $q_s + \epsilon$, where $\epsilon$ is chosen as the value 1.

In step 345, method 235 calculates the slope $m_1$ and $m_2$, which are expressed as follows:

$$m_1 = (R_{Mopt} - R_{Mopt-\epsilon})/(D_{Mopt,+\epsilon} - D_{Mopt}) \text{ and } m_2 = (R_{Mopt,-\epsilon} - R_{Mopt})/(D_{Mopt} - D_{Mopt,-\epsilon}) \quad (2)$$

which are the two slopes above and below the operating point, respectively.

In step 350, the unselected modes k are adjusted (trade-off operation) using the slopes $m_1$ and $m_2$ as follows:

$$\text{If } (D_{Mj} < D_{Mopt}), \text{ then } \overline{R}_{Mk} = R_{Mk} - m_2 * (D_{Mopt} - D_{Mk}) \quad (3)$$

$$\text{Else, } \overline{R}_{Mk} = R_{Mk} + m_1 * (D_{Mk} - D_{Mopt})$$

In other words, if the distortion for an unselected coding mode k is less than the chosen mode, then the adjusted bitcount (which is the estimated bitcount at $D_{mopt}$) decreases in accordance with equation (3). If the distortion for an unselected coding mode k is more than the chosen mode, then the adjusted bitcount (which is the estimated bitcount at $D_{mopt}$) increases in accordance with equation (3).

In step 360, after adjusting all the modes k, the coding mode with the least bitcount $\bar{R}_{Mk}$ at the operating distortion is chosen as the best coding mode in the rate-distortion sense. In some cases, the previously chosen coding mode is retained as the best coding mode, while in some cases, the trade-off causes a different coding mode to be selected.

The quantization scale factor can be incremented suitably for the selected coding mode to reach the desired distortion $D_1$. Such a step would ensure that a uniform distortion is maintained across all macroblocks in a frame. It should be noted that if the quantization scale factor is not incremented, then even though the mode decision is still the best for the current macroblock, the fact that the distortion at the preset $q_s$ is less than the average over the previous macroblocks might affect the number of bits available for the subsequent macroblocks. By adjusting $q_s$ back to obtain a distortion as close as possible to the average, the future bit-allocations and mode decisions will not be adversely affected.

Returning to FIG. 3, method 235 proceeds to step 370 and queries whether the current block is the last macroblock of the frame. If the query is negatively answered, then method 235 returns to step 310 (or step 205 if method 200 is employed). If the query is affirmatively answered, then method 235 ends in step 375.

Figure 6:
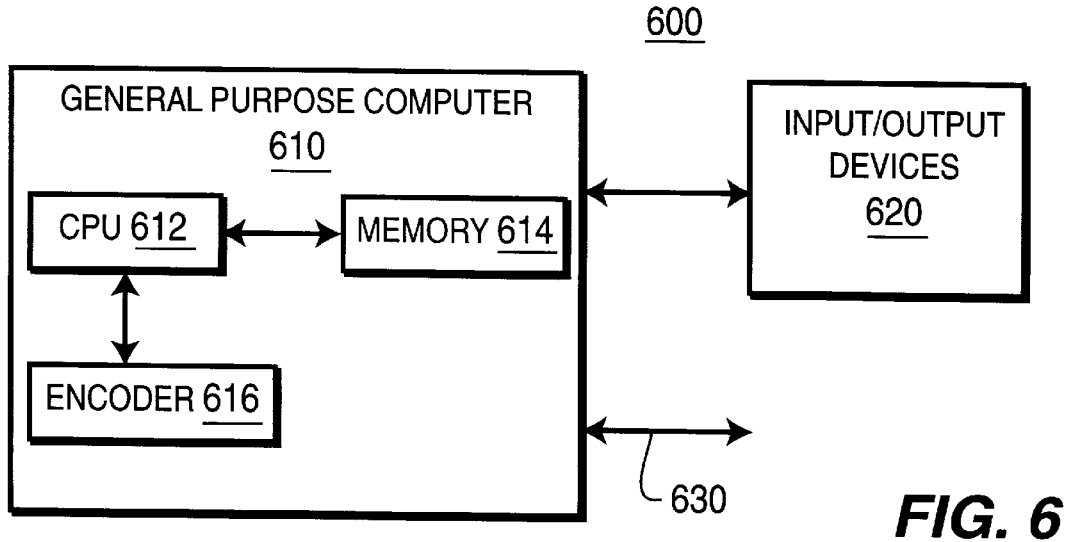
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 as discussed above. The encoder 616 can be a physical device which is coupled to the CPU 612 through a communication channel. Alternatively, the encoder 616 can be represented by a software application which is loaded from a storage device, e.g., a magnetic or optical disk, and resides in the memory 612 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

There has thus been shown and described a novel apparatus and method that selects a macroblock coding mode based upon the measured distortion and the bits required for each mode. Many changes, modifications, variations and other uses and applications of the subject invention will, however, become apparent to those skilled in the art after considering this specification and the accompanying drawings which disclose the embodiments thereof All such changes, modifications, variations and other uses and applications which do not depart from the spirit and scope of the invention are deemed to be covered by the invention, which is to be limited only by the claims which follow.

What is claimed is:

1. A method for selecting a coding mode from a plurality of available coding modes, where said selected coding mode is used to code one or more blocks of an input image signal, said method comprising the steps of:

(a) computing an expected operating distortion measure for the block;

(b) selecting an initial coding mode from said plurality of available coding modes, where said selected initial coding mode has an associated distortion measure that is closest to said expected operating distortion measure;

(c) applying a trade-off operation to said unselected coding modes; and (d) comparing said unselected coding modes after said trade-off operation with said selected initial coding mode to determine a best coding mode for the block.

2. The method of claim 1, wherein said trade-off operation of said applying step (c) is based on said associated distortion measure of said selected initial coding mode.

3. The method of claim 2, wherein said trade-off operation comprises the steps of:

(c1) obtaining a pair of a coding distortion and a coding bit count using a first quantization scale of $q_s+\epsilon$ and a second quantization scale of $q_a-\epsilon$, where $q_s$ is a quantization scale selected for the block and $\epsilon$ is a constant;

(c2) using said pair of a coding distortion and a coding bit count to derive a plurality of adjustment factors; and (c3) adjusting a coding bit count for each of said unselected coding modes using one of said adjustment factors.

4. The method of claim 3, wherein said plurality of adjustment factors represents a pair of slopes $m_1$ and $m_2$ defined by said pair of coding distortion and coding bit count.

5. The method of claim 4, wherein said pair of slopes $m_1$ and $m_2$ are calculated in accordance with:

$$m_1=(R_{Mopt}-R_{Mopt+\epsilon})/(D_{Mopt,+\epsilon}-D_{Mopt}), \text{ and } m_2=(R_{Mopt,-\epsilon}-R_{Mopt})/(D_{Mopt}-D_{Mopt,-\epsilon})$$

where $R_{Mopt}$ is a coding bit count of said selected initial coding mode, where $R_{Mopt-\epsilon}$ is a coding bit count of said selected initial coding mode using said quantization scale $q_s+\epsilon$, where $R_{Mopt-\epsilon}$ is a coding bit count of said selected initial coding mode using said quantization scale $q_s-\epsilon$, where $D_{Mopt}$ is said distortion measure associated with said selected initial coding mode, where $D_{Mopt+\epsilon}$ is a distortion measure associated with said selected initial coding mode using said quantization scale $q_s+\epsilon$, where $D_{MOPt-\epsilon}$ is a distortion measure associated with said selected initial coding mode using said quantization scale $q_s-\epsilon$.

6. The method of claim 3, wherein said adjusting step (c3) adjusts each of said coding bit count of said unselected coding modes in accordance with:

if $(D_{Mj}<D_{Mopt})$, then $R_{Mj}=R_{Mj}-m_2*(D_{Mopt}-D_{Mj})$, else, $R_{Mj}=R_{Mj}+m_1*(D_{Mj}-D_{Mopt})$ where $D_{Mj}$ is a distortion measure associated with a coding mode j of said unselected coding modes, where $D_{Mopt}$ is said distortion measure associated with said selected initial coding mode, where $m_1$ and $m_2$ are said adjustment factors, where $M_{Mj}$ is a coding bit count associated with a coding mode j of said unselected coding modes.

7. The method of claim 1, wherein said block is a macroblock.

8. The method of claim 1, wherein said determine a best coding mode for the block in step (d) is accomplished by selecting a coding mode with a lowest coding bit count for the block.

9. The method of claim 1, wherein said associated distortion measure of said selected initial coding mode is a distortion measure of the block having undergone encoding.

10. The method of claim 1, further comprising the steps of:

(a') comparing a distortion measure associated with each of said plurality of available coding modes with a first threshold, where said plurality of available coding modes comprises non-intra coding modes; and (a'') eliminating an intra coding mode from consideration if all of said distortion measures are lower than said first threshold.

11. The method of claim 10, further comprising the steps of:

(a''') comparing a distortion measure associated with each of said plurality of available coding modes with a second threshold; and (a'''') eliminating said intra coding mode and any non-intra coding modes from consideration if said distortion measure of said non-intra coding modes is greater than a distortion measure associated with said intra coding mode.

12. Apparatus for selecting a coding mode from a plurality of available coding modes, where said selected coding mode is used to code one or more blocks of an input image signal, said apparatus comprising:

means for computing an expected operating distortion measure for the block;

means, coupled to said computing means, for selecting an initial coding mode from said plurality of available coding modes, where said selected initial coding mode has an associated distortion measure that is closest to said expected operating distortion measure;

means, coupled to said selecting means, for applying a trade-off operation to said unselected coding modes; and means, coupled to said applying means, for comparing said unselected coding modes after said trade-off operation with said selected initial coding mode to determine a best coding mode for the block.

13. The apparatus of claim 12, wherein said trade-off operation is based on said associated distortion measure of said selected initial coding mode.

14. The apparatus of claim 13, wherein said applying means comprises:

means for obtaining a pair of a coding distortion and a coding bit count using a first quantization scale of $q_s+\epsilon$ and a second quantization scale of $q_s-\epsilon$, where $q_s$ is a quantization scale selected for the block and $\epsilon$ is a constant;

means, coupled to said obtaining means, for deriving a plurality of adjustment factors by using said pair of a coding distortion and a coding bit count; and means, coupled to said deriving mean, for adjusting a coding bit count for each of said unselected coding modes using one of said adjustment factors.

15. The apparatus of claim 14, wherein said plurality of adjustment factors represents a pair of slopes $m_1$ and $m_2$ defined by said pair of coding distortion and coding bit count.

16. The apparatus of claim 12, wherein said block is a macroblock.

17. A method for eliminating one or more coding modes from a plurality of available coding modes, where one of said remaining coding modes is used to code one or more blocks of an input image signal, said method comprising the steps of:

(a) comparing a distortion measure associated with each of said plurality of available coding modes with a first threshold, where said plurality of available coding modes comprises non-intra coding modes; and (b) eliminating an intra coding mode from consideration if all of said distortion measures are lower than said first threshold.

18. The method of claim 17, further comprising the steps of:

(c) comparing a distortion measure associated with each of said plurality of available coding modes with a second threshold; and (d) eliminating said intra coding mode and any non-intra coding modes from consideration if said distortion measure of said non-intra coding modes is greater than a distortion measure associated with said intra coding mode.

19. An encoding system for an image sequence having a plurality of images, said system comprising:

a motion estimation module for generating a plurality of motion vectors;

a motion compensation module, coupled to said motion estimation module, for generating a predicted image using said plurality of motion vectors, where said predicted image is subtracted from a current image in the image sequence to generate a predictive residual; and an mode decision module, coupled to said motion compensation module, for selecting a coding mode from a plurality of available coding modes, where said selected coding mode is used to code one or more blocks of said predictive residual or said current image, said mode decision module comprises:

means for computing an expected operating distortion measure for the block;

means, coupled to said computing means, for selecting an initial coding mode from said plurality of available coding modes, where said selected initial coding mode has an associated distortion measure that is closest to said expected operating distortion measure;

means, coupled to said selecting means, for applying a trade-off operation to said unselected coding modes; and means, coupled to said applying means, for comparing said unselected coding modes after said trade-off operation with said selected initial coding mode to determine a best coding mode for the block.

20. The system of claim 19, wherein said trade-off operation is based on said associated distortion measure of said selected initial coding mode.

* * * * *